United States Patent
Mathis

[11] 3,857,819
[45] Dec. 31, 1974

[54] POLYUREA FIBERS BASED ON POLY(4,4'-METHYLENEDICYCLOHEXYLENE)UREA

[75] Inventor: Ronald Dean Mathis, Taylors, S.C.

[73] Assignee: E. I. du Pont de Nemours and Company, Wilmington, Del.

[22] Filed: Mar. 5, 1973

[21] Appl. No.: 338,100

[52] U.S. Cl.................. 260/77.5 CH, 260/77.5 C
[51] Int. Cl............................................. C08g 22/02
[58] Field of Search ............... 260/77.5 CH, 77.5 C

[56] References Cited
UNITED STATES PATENTS

| | | | |
|---|---|---|---|
| 3,185,656 | 5/1965 | Gabler et al. | 260/3.2 |
| 3,223,682 | 12/1965 | Gabler et al. | 260/77.5 |
| 3,249,591 | 5/1966 | Gadecki et al. | 260/78 |
| 3,647,355 | 3/1972 | Williams | 260/785 X |

Primary Examiner—H. S. Cockeram

[57] ABSTRACT

A fiber of a polyurea wherein at least about 97 mole percent of its recurring units have the formula

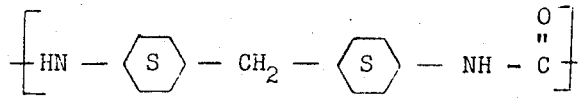

and from 0 to about 3 mole percent of its recurring units have the formula

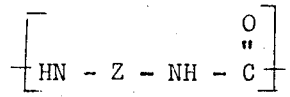

where Z is a selected divalent organic radical, and at least about 69 percent of the

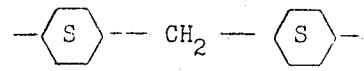

groups have both

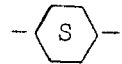

groups in the trans configuration. The fibers can be used to produce fabrics having good wash-wear and ease-of-care properties. The polymers can be prepared by reacting PACM with urea or PACM with PICM, and a small optional amount of $H_2N-Z-NH_2$.

3 Claims, No Drawings

3,857,819

POLYUREA FIBERS BASED ON POLY(4,4'-METHYLENEDICYCLOHEXYLENE)UREA

FIELD OF THE INVENTION

This invention relates to novel fibers of a polyurea, including a copolyurea. More particularly the fibers are prepared from a poly(4,4'-methylenedicyclohexylene)urea, and provide fabrics having good wash-wear and ease-of-care properties.

BACKGROUND OF THE INVENTION

Polymers of poly(4,4'-methylenedicyclohexylene)urea are known. These polymers are also known as PACM-1 polymers and will be referred to as such herein. They are generally prepared from bis(4-aminocyclohexyl)methane (PACM) and bis(4-isocyanatocyclohexyl)methane (PICM). Filaments prepared from them are also known and are described in Williams U.S. Pat. No. 3,647,355, and mentioned in Gabler et al. U.S. Pat. No. 3,223,682. However, the polymers and fibers prepared from them as described in the art patents lack certain properties. Thus, the fibers of this invention have superior levels of properties, e.g., tenacity, initial modulus and sonic velocity which makes them particularly useful in fabrics where good wash-wear and ease-of-care properties are desirable.

SUMMARY OF THE INVENTION

A synthetic fiber of a polyurea wherein at least about 97 mole percent of its recurring units have the structural formula

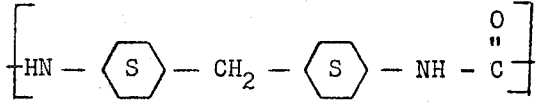

and from 0 to about 3 mole percent of its recurring units have the structural formula

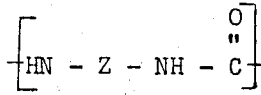

wherein

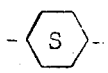

represents a 1,4-cyclohexylene group and Z represents a divalent organic group selected from alkylene of three to six carbon atoms,

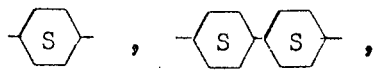

and

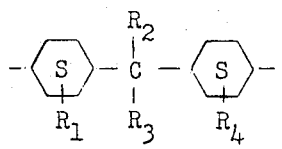

where $R_1$, $R_2$, $R_3$ and $R_4$ each represent hydrogen or methyl groups with the proviso that at least one of $R_1$–$R_4$ is methyl; and wherein at least about 69 percent of the

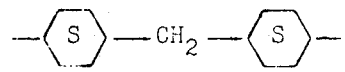

groups, at least about 69 percent of the

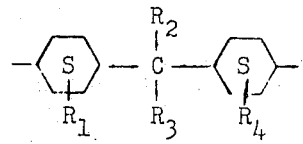

groups, and at least about 69 percent of the

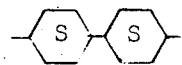

groups, have both their cyclohexylene moieties in the trans configuration; and at least about 69 percent of the

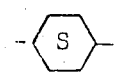

groups in the formula

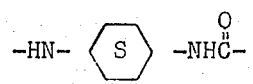

are in the trans configuration; said fiber having an initial modulus of at least about 70 gpd. and a sonic variety of at least 3.0 km./sec.

DESCRIPTION OF THE INVENTION

The Polymer Employed in the Fibers

This invention encompasses the homopolymer (known as PACM-1) of bis(4-aminocyclohexyl)methane (PACM),

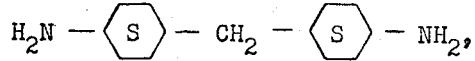

and bis(4-isocyanatocyclohexyl)methane (PICM),

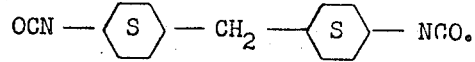

This homopolymer consists essentially of the repeating structural units:

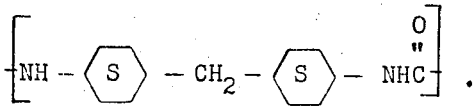

This invention also encompasses copolymers in which up to 3 mole percent of the above repeating units are replaced by structural units of the formula:

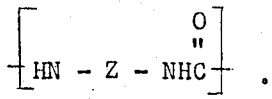

Such groups are usually obtained from the diamine $H_2N - Z - NH_2$ or a mixture of such diamines, e.g., trimethylenediamine; tetramethylenediamine; pentamethylenediamine; hexamethylenediamine; 1,4-diaminocyclohexane; perhydrobenzidine; bis(2-methyl-4-aminocyclohexyl)methane; and bis-2,2-(p-aminocyclohexyl)propane.

The

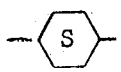

groups, due to their geometric nature, exist as a mixture of isomers having trans or cis configurations. These configurations are discussed in British Pat. No. 1,163,895. As stated above, at least about 69 percent of the

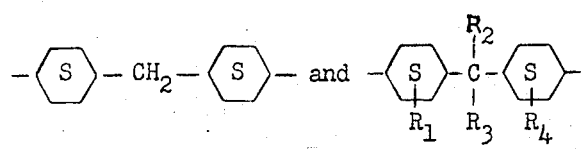

groups have both their

groups in the trans configuration; at least about 69 percent of

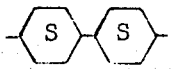

groups present have both

groups in the trans configuration; and at least 69 percent of the

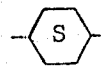

groups present in

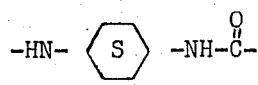

are in the trans configuration. In the double ring groups the trans configuration for both cyclohexylene groups will be referred to as $t,t$ configuration (for trans,trans), and the percent $t,t$ configuration in any given polymer will be referred to as $t,t$ isomer content. The minimum $t,t$ isomer content of 69 percent is necessary in order to obtain the good properties of the filaments and fabrics made of the polymer. This may be accomplished, e.g., by using PACM and PICM reactants wherein at least about 69 percent (or, e.g., 48 percent and 90 percent, respectively) of the double ring groups have their cyclohexylene radicals in the $t,t$ configuration.

If desired the polymers used to make the fibers of this invention may be chain terminated with a suitable agent or agents to assist in controlling the molecular weight of the product. Among the suitable chain terminators are monofunctional compounds which can react with the isocyanate ends of these products, such as ammonia, monoamines (e.g., methylamine, dimethylamine, ethylamine, butylamine, dibutylamine, aniline, etc.) and monofuctional compounds which can react with the amine ends of the polyureas such as acid chlorides, (e.g., acetyl chloride, benzoyl chloride) and isocyanates (e.g., phenyl isocyanate, m-tolyl isocyanate, ethyl isocyanate, etc.). Chain termination can be achieved, also, by use of an excess of monomers.

The polymers generally have an inherent viscosity, defined further below, of at least about 0.5 to 3.5 or higher.

Preparation of the Polymers Employed in the Fibers

To obtain 69 percent $t,t$ isomer content in the polymer, it is easiest to use PACM and PICM monomers in which 69 percent of the

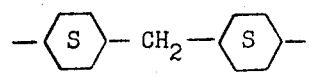

groups have the $t,t$ configuration. Such configurations can be achieved as described in U.S. Pat. No. 2,494,563 and U.S. Pat. No. 2,606,924 where the different hydrogenation conditions that produce the different configurations in PACM are recited. The corresponding PICM configuration can be obtained by reacting the PACM with phosgene to form a biscarbamyl chloride intermediate which, when heated, loses HCl to form the diisocyanate.

The polymers may be prepared in several ways. PACM and PICM may be reacted together (here each may contain 69 percent $t,t$ isomer content or one may contain 48 percent while the other contains 90 percent, etc.) or PACM may be reacted with urea as described in U.S. Pat. No. 3,223,682.

Preferably, essentially chemical equivalent quantities of PACM and PICM are reacted by low temperature solution polymerization. This polymerization produces no by-products and permits direct formation of solutions of the polymer which are suitable for spinning fibers therefrom. This polymerization is preferably carried out under anhydrous conditions in a solvent system where the solvent is either hexamethylphosphoramide (HMPA)/lithium chloride or N,N-dimethylacetamide (DMAc)/lithium chloride, wherein the lithium chloride constitutes from 1.1 to 4.0 and from 2.7 to 4.1 weight percent of each system, respectively. In addition, 1,1,2-trichloroethane can be used as a reaction medium if the procedure described further below in this section is followed.

An exemplary preparation is to stir a solution of PACM in DMAc (cooled in a 5°C. bath) under nitrogen while adding a solution of PICM in DMAc/lithium chloride. The PICM solution may be added dropwise over a relatively long period of time (e.g., 1 hour or longer) or during a shorter period (e.g., 10 min.). Stirring is continued (e.g., for 15 minutes – 1 hour) after which the reaction mixture is permitted to stand overnight (or it may be stirred overnight at room temperature). Shaped articles may then be prepared directly from the reaction mixture (e.g., films cast or fibers spun), or solid polyurea may be precipitated from the solution by combining the reaction mixture with water, after which the polyurea is collected, washed, and dried before being stored prior to further processing.

In a variation of the foregoing procedure, the PICM may be added in a solution of DMAc, after which incremental amounts of lithium chloride are added to the reaction mixture until the desired amount of salt is present. The reaction mixture may then be stirred or be permitted to stand before obtaining shaped articles as described above. In still another variation of the procedure, the PICM in a solution of DMAc/lithium chloride may be added rapidly to the reaction mixture until nearly all (e.g., 90 percent) has been added. The remaining PICM/DMAc/lithium chloride solution is then slowly added until the desired solution viscosity is obtained.

Where the $t,t$ configuration is present in at least about 90 percent of the double ring groups, a HMPA/lithium chloride mixture is the preferred solvent system, and the PACM and PICM are reacted via the procedures described above for the DMAc/lithium chloride systems.

In order to obtain clear solutions, i.e., nongelling solutions, by the above-described procedures, it is generally required that at least three moles of salt per mole of polymer be present when DMAc is used and that one mole of salt per mole of polymer be present when HMPA is employed. Preferably moisture, $CO_2$, and carbonates are excluded from the polymerization mixture to assist in avoiding gelation of the reaction product.

Although the PACM-1 useful in this invention is insoluble in 1,1,2-trichloroethane, high molecular weight polymers can be prepared in this medium. A solution of PICM is added rapidly to a stirred solution of PACM, both in the 1,1,2-trichloroethane, in a blender or resin kettle. The polymer which precipitates is usually difficult to filter because of its small particle size. However, addition of a small amount of water assists in agglomerating the polymer and facilitates filtration. After being collected by filtration, the polymer can be washed with alcohol, water, and acetone prior to being dried.

The above-described procedures can be employed to prepare the copolymers encompassed by this invention by, e.g., replacing up to 3 mole percent of the PACM with a diamine or a mixture of diamines corresponding to formula $H_2N - Z - NH_2$ as hereinbefore described.

Preparation of Shaping Solutions

The polyureas and copolyureas of this invention which are prepared as described above can be used directly if they are not isolated from their solvent systems. If they have been precipitated, however, they can be redissolved in the system to obtain a solution containing 5 to 10 percent by weight polymer. As the mole percent of the double ring groups having t,t configuration present increases above 69 percent, the solubility of the polymer decreases. However, the polymer will be soluble in mixtures of formic acid/1,1,2-trichloroethane/trifluoracetaic acid (e.g., 62/32/6, by weight). Shapable solutions containing up to 25 percent by weight of the polymer can be prepared in these three-component solvent systems.

Preparation of the Fibers

The fibers of this invention are prepared by first extruding the above-described polyurea solutions by wet- and dry-spinning techniques (the latter is preferred), and then hot-drawing the as-spun fibers.

For example, DMAc/lithium chloride solutions, containing 5 to 10 percent by weight, preferably 9–10 percent by weight, of the polyurea may be extruded through spinneret assemblies into heated columns swept with cocurrent flow of a hot, dry inert gas, e.g., nitrogen, to form fibers. Solutions exhibiting inherent viscosities of 200–1,500 poises are most suitable for dry spinning. When the polymer exhibits higher levels of inherent viscosity, lesser amounts of the polymers are needed to provide spinning solutions having desirable levels of solution viscosity. The use of moisture-free spinning apparatus (e.g., spinneret, filter assembly, spinning adapter) assists in providing smooth spinning without pressure buildup due the the presence of any polymer precipitated by the presence of water.

Polyureas with inherent viscosities of up to 3 may also be spun into fibers from formic acid/1,1,2-trichloroethane solutions containing from about 5 to 25 percent by weight polymer.

Polyureas wherein about 90 mole percent or more of the double ring groups are in the $t,t$ configuration are preferably wet spun from HMPA/lithium chloride systems containing from 1.2 to 3.6 percent by weight lithium chloride and from 5 to 8 percent by weight polymer.

After being formed, the freshly extruded fibers preferably are washed prior to being further processed. Fibers spun from formic acid/trichloroethane systems are usually dried in air, then extracted for several hours (e.g., up to 16 hours) in methanol, after which they are dried again. Fibers spun from DMAc/lithium chloride and HMPA/lithium chloride systems are washed well with water (e.g., up to 24–48 hours) to assist in removing residual solvent and salt. The washed fibers are preferably plied while still wet prior to being processed further. Wet spun fibers also are well washed with water (running water or water periodically changed), then dried at room temperature on the bobbin until shrinking ceases.

The as-spun fibers are then subjected to hot drawing and heat setting operations. Dry spun, well-extracted as-spun fibers, preferably still slightly damp, are hot drawn about 2–4X, preferably about 2.5–3.7X, at temperatures within the range of 200°–350°C., preferably within the range of 260°–300°C., most preferably at about 285°C. Drawing may be accomplished in single or multiple stages (e.g., two), depending on, e.g., denier of the feed fiber and the type of device used for the heat treatment. Wet spun fibers are hot drawn at lower draw ratios than those described above. For example, PACM-1 fibers (containing 90 percent, $t,t$ isomer content), wet spun from HMPA, are drawn 1–2.2X at 250°–325°C. (10–25 ft./min. input speed) in the longer of the two heating devices described below.

A preferred hot drawing device is an induction heated drawing tube or furnace whose length, capacity, and heating chamber temperature are sufficient to effect the desired property improvements in the feed yarn as it is passed through the tube at the appropriate velocity. Fibers of this invention have been successfully hot drawn in devices whose lengths range from about 1–6 feet. For example, one device used to hot draw (single stage) dry spun fibers of homopolymeric poly(4,4'-methylenedicyclohexylene urea) may be described as follows: A length of ½ inch (O.D.) stainless steel tube is wrapped with a ⅛ inch (O.D.) coiled stainless steel tube which is led into the ½ inch tube through a hole in its outer circumferential surface. This assembly is placed in a tube furnace 1 ft. long. A nitrogen stream is passed through the coiled tube, preheated therein by the furnace, and directed into the ½ inch tube to provide a heated nitrogen atmosphere for the fibers as they are drawn through the ½ inch tube. The nitrogen flow rate is usually 3,000–3,500 cm.$^3$/min. Crystalline, oriented yarn is obtained when the feed yarn (e.g., 70 denier/50 filament) is drawn about 2.3X at 285°C. at an input speed of 10 ft./min.

When input speeds of from 10–25 ft./min. or when large denier feed yarns are used, the hot drawing operation with the above-described device may be split into two stages in order to improve yarn properties while the yarn is processed at a higher rate of productivity. This is accomplished by initially drawing the yarn at room temperature at a rate fast enough to be processed through the heated device, (e.g., 1.3X at room temperature, followed by 1.54X at 275°C., at a rate of 20 ft./min.). Following this drawing, the degree of crystallinity of the drawn yarn can then be controlled by the tube furnace temperature and the yarn velocity through the furnace. For example, at a furnace temperature of 300°C. and an input speed of 25 ft./min. of a taut feed yarn (previously drawn at room temperature), a highly crystalline yarn is produced. Orientation of the fiber increases as the yarn speed through the furnace decreases. This type of operation is satisfactory for drawing higher denier yarn, e.g., 90 denier/50 filament yarn, at 30 ft./min. input speed.

An alternately preferred hot drawing device is a 6 ft. long, 3/4 inch (outside diameter) induction heated drawing tube which has a constant temperature over almost the entire tube length. This tube is swept with a slow stream of nitrogen preheated to the drawing temperature. In this device, yarns of as-spun fibers are generally drawn 2–3.7X at 250°–320°C. and 10–35 ft./min. input speed. For example, a feed yarn which is plied under tension before being extracted with water is drawn 2.5X at 280°C. and 25 ft./min. input speed to produce a yarn with the following tensile properties: T/E/Mi: 4.3/6.3/104. Other yarns drawn at hgher temperatures (e.g., 290°–325°C.) exhibit lower elongations but somewhat higher initial modulus values. With this device, drawing in the temperature range of from 280°–300°C. gives the best overall yarn properties. A highly favored feed yarn for hot drawing is an as-spun polyurea fiber dry spun from trifluoroacetic acid/1,1,2-trichloroethane. For example, when such a yarn is drawn 2.6X at 280°C., with a 10 ft./min. input speed, the resulting yarn exhibits the following properties: T/E/Mi: 4.7/6.5/104. A similar sample, drawn 3.5X at 280°C., exhibits the following filament properties: T/E/Mi: 5.8/6.2/116. When this sample is redrawn 1.08X at 300°C. (25 ft./min. input), T/E/Mi become 6/5.4/128. Multiple-stage drawing can also be employed with this particular heating device. For example, after an as-spun yarn is drawn 1.6X at room temperature, then drawn 2.9X at 250°C. at 10 ft./min.

input speed, the following yarn tensile properties are observed: T/E/Mi: 4.06/6/93. Similar improvements are observed in yarns characterized 94 percent $t,t$ isomer content.

The Fibers

The fibers of this invention, spun and drawn as described above, are useful in textile applications because of their overall combinations of properties. The fibers exhibit a desirable combination of properties including: high tensile properties (initial modulus and tenacity) and high recovery (tensile and work recovery, TR and WR), both at room temperature and at elevated temperatures. In addition, the fibers exhibit high sonic velocity (SV) and sonic modulus (SM), high wash-set recovery angle (WSRA), excellent stability against degradation and loss of properties caused by ultraviolet light, oxidative bleach treatments, exposure to commercial dry cleaning solvents, exposure to high temperatures, and exposure to acids and bases. In addition, they exhibit excellent flexural properties, low shrinkage, and display good transverse properties. This desirable combination of properties which characterize the polyurea fibers of this invention favors their use in textile applications.

Although each of the above properties are considered desirable, some are most significant in fabric-end uses. For example, the wash-set recovery angle of a fiber indicates its wash-wear potential; fibers of this invention exhibit excellent wash-wear properties, as characterized WSRA values generally in excess of about 300°. The work recovery (WR) of a fiber characterizes wrinkle resistance; fibers of this invention exhibit WR values greater than about 65 percent at room temperature. Similarly, fibers of this invention exhibit tensile recovery TR values greater than about 85 percent at room temperature. The room temperature tensile properties (tenacity and initial modulus) of the fibers of this invention are highly desirable, being generally in excess of about 3.0 gpd and 70 gpd, respectively. These fibers are particularly outstanding in their retention of properties at elevated temperatures. At 150°C. in air, for example, they usually retain about 40–60 percent of the room temperature tenacity and modulus. Fibers wherein the $t,t$ isomer content is about 90 percent or higher exhibit superior thermal stability since fiber properties (T/E/Mi: 3.7/5.5/85 for fiber drawn 1.4X/300°C.) are essentially unchanged over an exposure period of 234 hours at 150°C. ($N_2$ atmosphere). Fibers which are highly drawn exhibit low orientation angles (O.A.).

The fibers of this invention exhibit tensile modulus (Mi, initial modulus) values of at least about 70 gpd. and higher, measured as described herein. These values are obtained (1) when the required $t,t$ isomer content is at least about 69 percent and (2) when the fiber is hot drawn as described above. The theoretical limit for tensile modulus for PACM-1 fibers is about 1,000 gpd.

It is observed that a relationship exists among $t,t$ isomer content, amount of drawability obtainable, drawing temperature, and the properties of the drawn fibers. For example, the values of tensile modulus and sonic velocity of the as-spun fibers (i.e., the extruded, washed, and dried, but undrawn fibers) are all in the same respective ranges (being about 20–30 gpd. and about 1.9 km./sec., respectively), regardless of the $t,t$ isomer content of the fiber, but the modulus values exhibited by the drawn fibers depend on the $t,t$ isomer content and the drawing conditions. As-spun fiber characterized by higher levels of $t,t$ isomer content can be drawn more than those of lower $t,t$ isomer content. Generally, the modulus value of the fiber increases, although not regularly, as the fiber is more highly drawn. A highly drawn fiber of lower $t,t$ isomer content may exhibit a higher modulus value than does a fiber of higher $t,t$ isomer content which is drawn less. These aspects are illustrated in the examples herein.

Fibers containing the prescribed amount of t,t isomer content and hot drawn as described herein also exhibit a sonic velocity (SV) of at least 3.0 km./sec. or higher. Sonic velocity is a structural parameter relating to the fiber's molecular orientation along the fiber axis. A higher value of sonic velocity is the result of a high degree of molecular orientation along the fiber axis. Sonic velocity and related parameters are described by Charch and Mosely in the "Textile Research Journal," Vol. XXIX, No. 7, 525–535 (1959) and by Moseley in the "Journal of Applied Polymer Science," Vol. III, No. 9, 266–276 (1960). The theoretical limit for sonic velocity is about 9.4 km./sec. Sonic modulus (SM) values are at least about 100 gpd. or higher.

The fibers exhibit transverse tenacity values of about 1–3 gpd. The transverse tenacity of a filament, or "loop" strength as it is frequently called, is largely a measure of brittleness of the filament. Although a fiber might exhibit quite acceptable values of strength tenacity and elongation under specified conditions, if it does not have good transverse tenacity and elongation at the same conditions, it will be extremely brittle and hence will be totally unsuited in woven or knitted fabrics which must encounter severe usage conditions. In this regard, it is pointed out in "The Journal of the Textile Institute," Vol. 38, page T43 (1947), that fibers which, though of very high tensile strength, break very easily on bending, may be less servacable in use in twisted cord or woven fabrics than weaker, more flexible fibers.

It has been found that the fibers of this invention exhibit superior levels of properties, e.g., tenacity, initial modulus, and sonic velocity when contrasted to equivalently treated fibers of polyureas and copolyureas which are chemically equivalent but which contain lower percentages of $t,t$ isomer content.

MEASUREMENTS AND TESTS

Inherent Viscosity

Inherent viscosity ($\eta$ inh) is defined by the following equation:

$$\eta\text{inh} = \ln(\eta\text{rel})/C$$

wherein ($\eta$rel) represents the relative viscosity and C represents a concentration of 0.5 gram of the polymer in 100 ml. of solvent. The relative viscosity ($\eta$rel) is determined by dividing the flow time in a capillary viscometer of a dilute solution of the polymer by the flow time for the pure solvent. The dilute solutions used herein for determining ($\eta$rel) are of the concentration expressed by (C), above; flow times are determined at 30°C.; in all cases m-cresol is used as solvent unless otherwise noted.

Fiber Tensile Properties

Filament properties are measured on fibers that have been conditioned at 21°C. and 65 percent relative humidity (R.H.) for at least 16 hours unless otherwise specified. Yarn properties are measured on yarn that has been conditioned at 24°C. and 55 percent R.H. for at least 16 hours. All measurements are made in the fiber conditioning environment.

Tenacity (breaking tenacity) (T), elongation (breaking elongation) (E), and initial modulus (Mi) are obtained from breaking a single filament or a multifilament yarn on an Instron tester (Instron Engineering Corp., Canton, Mass.).

Single filaments are broken with a gage length (distance between jaws) of 1.0 inch (2.54 cm.). The results on three filaments are averaged. Yarns are given three turns per inch (2.54 cm.) twist (under 0.1 gpd tension) and broken with a 10-inch (25.4 cm.) gage length. All samples are elongated at a constant rate of extension (10 percent elongation/minute for fibers having an E of under 8 percent, and 60 percent elongation/minute for fibers with E of 8 to 100 percent) until the sample breaks.

The denier of a single filament (d.p.f.) is calculated from its functional resonant frequency, determined by vibrating a 7 to 9 cm. length of fiber under tension with changing frequency (A.S.T.M. D1577–66, part 25, 1968). This filament is then used for 1 break.

The denier of yarn is determined by weighing a known length (at 0.1 gpd tension); 90 cm. length is convenient.

The tenacity (grams/denier), elongation (percent), and initial modulus (gram/denier) as defined in A.S.T.M. D2101, part 25, 1968 are obtained from the load-elongation curve and the measured denier. In actual practice, the measured denier of the simple, test conditions, and sample identification are fed to a computer before the start of a test; the computer records the load-elongation curve of the fiber as it is broken and then calculates the fiber properties.

It should be noted that different values are obtained from single filaments (filament properties) and from multi-filament strands (yarn properties) of the same sample.

Loop stress-strain measurements are obtained by looping two yarns or filaments over each other so that both ends of one yarn or filament are in the upper clamp of the Instron tester and both ends of the other yarn or filament are in the lower clamp of the tester after which a regular stress-strain determination is made. Knot tensile data is determined in the same way as conventional (straight) tenacity, elongation, and modulus except that an overhand knot is tied in the fiber sample before the two ends are placed in the clamp of the tester. Knot and loop strengths both measure the ability of the fiber sample to withstand strains transverse to the fiber axis.

If samples are not boiled off (scoured), they are generally conditioned at 12°C. and 65 percent R.H. for at least 16 hours unless otherwise specified. If boil-off is specified, it consists of boiling the filaments or yarns for 30 minutes in 0.1 percent aqueous sodium lauryl sulfate, rinsing, drying at 40°C. for 1 hour and conditioning at 21°C. and 65% R.H. for at least 16 hours, unless otherwise specified.

Work Recovery and Tensile Recovery

The terms work recovery and tensile recovery, coded as WR and TR, are reported in percent. These terms are used as defined in R. G. Beaman and F. B. Cramer, J. Poly. Sci., Vol. 21, 228 (1956). The subscripts on WR and TR refer to the percent elongation (e.g., 3 percent).

Wash-Set Recovery Angle (WSRA)

The wash-set recovery angles of fibers of this invention are determined by the procedures shown in Gadecki et al., U.S. Pat. No. 3,249,591.

Light Stability

For purposes of testing the light durability and discoloration of shaped articles of this invention, samples of fibers and/or films are exposed to light from an Xenon lamp in a Model 600-WR Weather-Ometer, a product of the Atlas Electric Devices Co., Inc., Chicago, Ill. The apparatus is operated according to the American Association of Textile Chemists and Colorists (AATCC) procedure number 16E-1964T.

Sonic Velocity (SV)

The sonic velocity values determined for the fibers of this invention are obtained by the procedures described in Canadian Pat. No. 894,849. Sonic modulus (SM) values are calculated as shown by Charch and Moseley, "Textile Research Journal," Vol. XXIX, No. 7, 525–535 (1959).

Spin Stretch Factor

The spin stretch factor is defined as follows:

S.S.F. = Velocity of yarn at wind-up (ft./min.)/Velocity of dope through spinneret (ft./min.)

where

Vel. of dope through spinneret = Rate of pumping (cu. ft./min.)/No. of spinneret holes x cross-sectional area of one hole (sq. ft.)

EXAMPLES

All percentages, except $t,t$ content, are by weight, unless otherwise noted.

EXAMPLE 1

This example illustrates the preparation of a fiber of PACM-1 having about 72 percent $t,t$ isomer content by dry spinning a formic acid/1,1,2-trichlorethane solution of the polymer. The drawn fibers exhibit excellent properties.

In a 500 ml. resin kettle equipped with a reflux condenser, a nitrogen inlet, a split-disc stirrer, and an addition funnel is placed a solution of 12.62 g. (0.060 mole) of bis(p-aminocyclohexyl)methane (PACM; 94 percent $t,t$ isomer content) in 190 ml. of N,N-dimethylacetamide (DMAc); the flask contents are then cooled in an ice bath. A solution of 15.74 g. (0.060 mole) of bis(p-isocyanatocyclohexyl)methane (PICM; 50 percent $t,t$ isomer content) in 150 ml. of DMAc/LiCl (93/7, wt. basis) is added to the rapidly stirred PACM solution. One half of the PICM solution is added over 10 minutes and the remainder then added in one lot. The ice bath is removed, stirring is continued for 5 minutes, and the mixture allowed to stand for five hours before being added to a large excess of water in a blender. The precipitated polymer is isolated by filtration and rewashed in water for four washing-filtration cycles. In the last wash cycle, the water is heated to near boiling. The white polymer, after being dried in a vacuum oven, weighs 27.3 g. and exhibits an inherent viscosity of 2.68.

Twenty grams of the above polymer are added slowly to 210 g. of a cold mixture of formic acid/1,1,2-trichloroethane (50/50, wt. basis). The ingredients are stirred rapidly for 45 minutes, without cooling, to form a 9 percent solids spin dope. The fluid dope is spun at a temperature of 67°–68°C. through a spinneret having 5 holes of 0.003 in. (0.076 mm.) diameter, each, into a column heated at 148°–150°C. The fibers are wound up at 160 yd./min. (146 m./min.); spin stretch factor is 4.0. The yarn is plied to 50 filaments on a perforated bobbin, extracted with water, and dried. The as-spun fiber exhibits an inherent viscosity of 2.22. After being drawn 2.5X through a tube (flushed with nitrogen) at 290°–300°C., the yarn exhibits an inherent viscosity of 1.24. Filaments tensile properties (without boil-off) exhibited are: T/E/Mi: 5.5/10/93. After being boiled off in water for 30 minutes (shrinkage is 0.8 percent), the filaments exhibit the following properties:

|  | Den./T/E/Mi |
|---|---|
| Straight | 1.05/6.0/9/95 |
| Knot | 1.0/1.8/3/70 |
| Loop | -/1.0/1/68 |
| 70°C. Wet | 1.23/4.8/6.8/86 |
| 90°C. Wet (at 10% extension rate) | 9.97/3.34/6.4/71 |
| 90°C. Wet (at 60% extension rate) | 0.70/4.0/7.1/84 |
| WR$_{2,3,5}$ | 78/69/55 |
| TR$_{2,3,5}$ | 94/89/81 |

The yarns exhibit the following properties:

|  | Den./T/E/Mi |
|---|---|
| Straight | 61/5.4/9/88 |
| Loop | 122/2.9/4.7/22 |
| Knot | 59/2.7/4/65 |
| WR$_{2,3,5}$ | 77/69/55 |
| TR$_{2,3,5}$ | 91/89/80 |
| WSRA | 330° |

After being boiled-off "taut," the filaments exhibit the following properties:

| T/E/Mi | 6.2/9/110 |
|---|---|
| WR$_{3/5}$ | 72/56 |
| TR$_{3/5}$ | 91/83 |

The drawn fibers exhibit high crystallinity and an orientation angle (OA) of 24°, as found by wide angle X-ray determinations.

Fiber shrinkage at various temperatures is low, as shown by the following data:

| Temperature, °C. | % Shrinkage |
|---|---|
| 100° | 0% |
| 150° | 1% |
| 200° | 1% |
| 250° | 0.5% |
| 300° | 1% |

EXAMPLE 2

This example illustrates the in situ preparation of a spinning solution of PACM-1 (72 percent $t,t$ isomer content) and the dry spinning of fibers therefrom. Drawn fibers exhibit excellent properties.

To a stirred solution of 25.24 g. (0.12 mole) of PACM (94 percent $t,t$ isomer content) in 350 ml. of DMAc is added a solution of 31.48 g. (0.12 mole) of PICM (50 percent $t,t$ isomer content) in 240 ml. of a 93/7 (wt./wt.) mixture of DMAc/LiCl. About 90 percent of the solution is added rapidly and the remainder is added dropwise. The 9 percent solids solution, which soon thickens to exhibit a viscosity of 150 poise, is allowed to stand for 8 days. A sample of the solution is removed and combined with water to precipitate the polymer, $\eta$inh = 1.21. It is then dry spun through a spinneret having 17 holes of 0.005 inch (0.0127 mm.) diameter, each, into a column heated with a stream of nitrogen at 275°C. The fibers are wound up at a speed of 171 yd./min. (156 m./min.). The yarn thus obtained is backwound, plied to 34 filaments, then extracted six days with water. After being dried, filaments exhibit T/E/M/Den.: 2.0/72.4/30.7/2.17. After being drawn (input speed of 25 fpm) 2.4X through a tube heated at 301°C., the filaments exhibit the following properties: T/E/M/Den.: 4.3/7.8/88/0.94; $WR_2$ = 75; $TR_2$ = 91; O.A. is about 45°. After a second heat treatment (input speed 10 fpm) at 301°C. (no drawing), the filaments exhibit T/E/Mi/Den.: 5.7/6.6/115/0.81; $WR_2/TR_2$ = 72/91; the filaments exhibit high crystallinity; O.A. =13°. This fiber exhibits a wash set recovery angle of 345° and good hot wet tensile properties, e.g.,:

| | Hot Wet Properties (90°C., wet) |
|---|---|
| | T/I/Mi/Den. |
| Straight | 2.45/4.2/54.1/0.86 |
| Loop (yarn) | 1.05/1.9/48.8/32.1 |
| Knot (yarn) | 1.44/2.8/51.7/33.3 |

EXAMPLE 3

This example illustrates the preparation of PACM-1 fibers (72 percent $t,t$ isomer content) of a very high initial modulus value.

A polyurea spinning solution is prepared as described in Example 1 by mixing DMAc/LiCl solutions of PACM and PICM ($t,t$ isomer content as in Example 1) to give a solution exhibiting a bulk viscosity of 2,240 poise. A sample of the polymer, isolated by precipitation in water, exhibits an inherent viscosity of 1.10. The DMAc/LiCl solutuion is dry spun, employing a 150 yd./min. windup speed.

The as-spun fibers, after being washed and dried, exhibit T/E/Mi/Den.: 1.65/76.1/25.1/3.2; fiber $\eta$inh = 1.11. After first being cold drawn (input speed 25 fpm) 1.5X at room temperature, then drawn 1.8X at 275°C., the drawn filaments exhibit T/E/Mi/Den.: 3.1/2.2/157/1.02. The fibers exhibit medium crystallinity; O.A. = 32°.

EXAMPLE 4

This example illustrates the preparation of PACM-1 fiber (69 percent $t,t$ isomer content) by the reaction of urea with PACM. The properties of drawn fibers are shown.

In a 500 ml. resin kettle fitted with a stirrer, nitrogen inlet, and a distillation head connected to a water cooled condenser is placed a mixture of 250 g. of m-cresol, 50 ml. of water, 9.0 g. (0.15 mole) of urea and 31.5 g. (0.15 mole) of PACM (69 percent t,t isomer content). The reaction mixture is heated at about 100°–165°C. for 2 hours while aqueous distillate is collected. The pot temperature is then raised to 203°–205°C. and most of the m-cresol is collected in the distillate. After the viscous residue is permitted to stand overnight, it becomes a gel. The gel is beaten in a mixer with methanol, filtered, allowed to stand overnight in fresh methanol, and is washed by being heated for 6 hours in a larger amount of methanol. It is collected and vacuum-dried at 80°C. The yield is 33.7 g. of polymer having an inherent viscosity of 1.20.

A solution of the above-prepared polyurea (13 percent polymer by weight) is prepared by dissolving 25 g. of the polymer in a solvent mixture comprising formic acid/1,1,2-trichloroethane/trifluoroacetic acid (106 g./54 g./10.8 g.). This solution is dry spun, after which the resulting fibers are collected, dried in air for 24 hours, and extracted overnight with methanol. Samples of the fibers are then passed at 25 ft./min. into a tube furnace (32 inches long, nitrogen atmosphere within) under the conditions shown below; fiber properties are shown.

| Sample | Drawing Conditions Amt. of Draw/ Temp.*, °C. | T | E | Mi | SV | SM |
|---|---|---|---|---|---|---|
| 1 | 2.0X/300 | 2.3 | 29 | 45 | | |
| 2 | 2.5X/285 | 4.1 | 12 | 72 | | |
| 3 | 2.8X/285 | 4.8 | 11 | 76 | | |
| 4 | 3.0X/300 | 4.7 | 10 | 77 | 3.29 | 122.3 |

*Temperature value is maximum temperature within the tube.

EXAMPLE 5

This example illustrates the preparation of a fiber of this invention (94 percent $t,t$ isomer content) by dry spinning a formic acid/1,1,2-trichloroethane/trifluoroacetic acid solution of PACM-1. Drawn samples of the fiber exhibit high tensile and sonic properties.

The above-described polyurea is prepared from urea and PACM (94 percent $t,t$ isomer content) by the procedure of Example 4, above.

A 17 percent solution of poly(4,4-methylenedicyclohexylene) urea (94 percent $t,t$ isomer content), prepared with 30 g. of polumer in 83 g. of formic acid, 42 g. of 1,1,2-trichloroethane, and 23 g. of trifluoroacetic acid, is dry spun through a spinneret having 5 holes of 0.005 inch (0.0127 cm.) diameter, each, into a column heated at 135°C. The emerging fibers are wound up at the rate of 100 yd./min. (91.4 m./min.). The yarn is plied four times to give a 20 filament yarn which is allowed to stand in methanol overnight. The as-spun fibers exhibit T/E/Mi/Den. of 1.4/80/27/14.4 and an inherent viscosity of 1.13. Samples of the yarn are drawn 2X at 300°C. through a 33-inch long over at 25 ft./min. Other samples are passed through a 6-foot long, induction heated drawing tube at 300°C. with a draw ratio of 3.4X. Fibers drawn 2X at 300°C. exhibit T/E/Mi/Den.: 3.3/12/69/6.7. Those drawn 3.4X and 300°c. exhibit filament properites of T/E/Mi/Den.: 6.0/4.8/133/3.8 and yarn properties of T/E/Mi/Den.: 4.7/3.1/181/225; inherent viscosity for the drawn fibers is 1.12. Sonic data are shown below.

| | Sonic Data | |
|---|---|---|
| Fiber | SV | SM |
| As-spun | 1.84 | 38.3 |
| Drawn 2X/300°C. | 3.01 | 102.4 |
| Drawn 3.4X/300°C. | 4.49 | 228 |

EXAMPLE 6

This example illustrates the preparation of a fiber of PACM-1 by dry spinning a solution prepared in situ, which comprises 71 percent t,t isomer content.

To a solution of 35.6 g. (0.17 mole) of PACM (91 percent $t,t$ isomer content) in 280 ml. of DMAc, at 5°C., is added, over 1.5 hour, a solution of 41.8 g. (0.16 mole) of PICM (50 percent $t,t$ isomer content) dissolved in a mixture of 428 ml. of DMAc and 30 g. of LiCl. The reaction mixture, maintained at 5°C., is stirred at high speed for 5 hours. It is then stirred at low speed overnight while the temperature is maintained at 10°C. A sample of the solution is removed and combined with water to precipitate the polymer; $\eta$ inh = 1.35.

The remaining solution is extruded through a 10-hole spinneret, each hole of 0.005 inch (0.0127 cm.) diameter, into a column heated between 172°–181°C. to form filaments of the polymer. The emerging filaments are wound up at 122 yd./min., plied six times, after which the yarn is extracted with distilled water for 48 hours. A water wet sample of the yarn is drawn 2.5X at 280°C. while being advanced at the rate of 35 ft./min. into a nitrogen-filled furnace 6 ft. in length. The drawn yarn exhibits the following T/E/Mi values: 3.9/7.4/90; corresponding filament values are: 4.3/13/79. The drawn yarn exhibits a WSRA of 340° and a sonic modulus of 128.3 gpd; sonic velocity is 3.37 km./sec.

EXAMPLE 7

This example illustrates the preparation of fibers by wet spinning a solution of poly(4,4-methylenedicylcohexylene) urea (93 percent $t,t$ isomer content) prepared in situ. The fibers are drawn.

A solution of 56.5 g. (0.27 mole) of PACM (91 percent $t,t$ isomer content) in 1,240 ml. of HMPA is placed in a 2 liter resin kettle fitted with a mechanical stirrer. A solution of 22.8 g. of LiCl and 70.5 g. (0.27 mole) of PICM (94 percent $t,t$ isomer content) in 450 ml. of HMPA is prepared; 400 ml. of this solution are added, with stirring, to the reaction flask over a 7 minute period, followed by 45.6 g. of LiCl. Another 115 ml. of the PICM solution is added over 2 hours, leaving 5 ml. of the PICM solution that had not been added. This remaining 5 ml. of the PICM solution is diluted with 200 ml. of HMPA and added to the polymerization mixture over 3 hours. The reaction mixture is stirred at 15°C. for an additional 20 hours. A sample of the solution is removed and combined with water to precipitate the polymer; $\eta$inch = 1.58. The clear spinning solution, which exhibits a bulk viscosity of 160 poise (Brookfield), is wet-spun through a 100-hole spinneret, each hole of 0.003 (0.0762 cm.) inch diameter, into a water bath at 50°C. The emerging fibers are passed over godet roll at the rate of 26–59 ft./min. They are then passed through a water wash bath at 55–65°C. (while being drawn about 1.05–1.15X), after which they are passed over a drying roll (while being drawn 1–1.07X). The yarns are heat treated and drawn (280°C./1.4–1.7X) at 25 fpm input speed to yield yarns with the following properties:

| Final Draw Ratio | T | E | Mi |
|---|---|---|---|
| 1.4X | 3.5 | 4.0 | 117 |
| 1.6X | 3.3 | 2.5 | 148 |
| 1.7X | 3.5 | 2.7 | 151 |

EXAMPLE 8

This example illustrates preparation and characterization of fibers of PACM-1 wherein the $t,t$ isomer content varies from about 32 to 59 percent.

PART A

Presented in the following Table I is a summary of the essential reaction conditions employed to prepare four polyurea samples wherein the $t,t$ isomer content values are 32, 49, 55, and 59 percent, respectively. These are prepared by the general method of Example 4. Inherent viscosity values are determined in m-cresol.

PART B

Shown in the following Table II is a summary of spinning details which describe the dry spinning of the polyurea fibers from the polymer samples whose syntheses are summarized in Table I cited in Part A. Fiber preparation is accomplished by the general procedure of Example 4, using heating, if necessary. In the "Solution" column of Table II, the corresponding "Sample" number polyurea from Table I is used in preparing the given solution. All solutions are spun through heated 5-hole spinnerets (65°–80°C.) having hole diameters of 0.005 inch, each, except Solution 4 which is spun through a 10-hole spinneret (hole diameter is 0.005 inch).

PART C

Summarized in the following Table III are fiber property and hot drawing data concerning the polyurea fibers whose preparation is described in Table II. It is observed that the drawn fibers exhibit significantly lower initial modulus values than do the polyurea fibers of this invention.

TABLE I

POLYUREA SYNTHESES FROM PACM AND UREA

| Sample | PACM t,t Isomer Content | Wt., g. | Urea Wt., g. | Reaction Medium | Pot Temp., °C., For Removal Of: Water | m-Cresol | Polymer $\eta$inh |
|---|---|---|---|---|---|---|---|
| 1 | 59%>69% 49% | 18<36 18 | 10.3 | m-Cresol, 250 ml. Water, 50 ml. | 103–143 | 203–205 | 1.14 |
| 2 (a) | 55% | 31.5 | 9.0 | m-Cresol, 250 ml. Water, 50 ml. | 100–165 | 206–207 | 0.78 |
| (b) | 55% | 15.8 | 4.5 | NMP, 175 ml. | 200 (NMP removal) | | 0.81 |
| 3 | 49% | 31.5 | 9.0 | m-Cresol, 150 ml. | 144–146 | 200–206 | 1.45 |
| 4 | 32.4% | 31.5 | 9.0 | m-Cresol, 250 ml. Water, 50 ml. | 102–168 | 203–207 | 1.55 |

Legend
NMP = N-methylpyrrolidone-2

TABLE II

SPINNING OF POLYUREA SOLUTIONS

| Solution | Polymer Grams | PACM Portion, t,t Isomer Content | ηinh | % in Soln. | Solvent, g. A | B | C | Temperature Range, Spinning Column, °C. | WUS* yd./min. |
|---|---|---|---|---|---|---|---|---|---|
| 1 | 31 | 50% | 1.14 | 18 | 94 | 48 | — | 146–153 | 100 |
| 2 | 26.4 } 6.7 | 55% 55% | 0.78 } 0.81 | 23 | 71 | 35 | 6.1 | 138–147 | 110 |
| 3 | 29 | 49% | 1.45 | 19 | 84 | 42 | — | 120–135 | 102 |
| 4 | 22 | 32.4% | 1.55 | 16 | 76 | 39 | — | 137–158 | 84 |

A = Formic Acid
B = 1,1,2-Trichloroethane
C = Trifluoroacetic Acid
* WUS = Windup Speed

TABLE III

FIBER AND DRAWING DATA

| Fiber From Table II Solution | PACM Portion, t,t Isomer Content | As-Extruded Fiber Properties | | | Drawing Conditions: Amount/ Temp., °C. | Drawn Fiber Properties | | | | |
|---|---|---|---|---|---|---|---|---|---|---|
| | | T | E | Mi | | T | E | Mi | SV | SM |
| 1 | 59% | 1.8 | 113 | 23 | 1.7X/280 | 2.8 | 27 | 39 | 2.53 | 72.3 |
| | | | | | 2.0X/290 | 3.3 | 23 | 46 | | |
| | | | | | 2.1X/295 | 3.3 | 20 | 48 | 2.66 | 80.0 |
| | | | | | 3.3X/310 | 1.7 | 34 | 32 | | |
| 2 | 55% | 0.9 | 25 | 25 | 3.5X/300 | 1.3 | 19 | 29 | 2.07 | 48.6 |
| 3 | 49% | 1.5 | 94 | 20 | 2.1X/238 | 3.9 | 13 | 44 | 2.91 | 95.7 |
| | | | | | 2.15X/258 | 4.0 | 13 | 47 | 2.95 | 98.3 |
| 4 | 32% | 1.3 | 89 | 22 | 1.8X/250 | 3.3 | 17 | 47 | 2.58 | 75.2 |
| | | | | | 2.1X/300 | 2.5 | 33 | 34 | | |

SV = Sonic Velocity in km./sec.
SM = Sonic Modulus in grams/denier

The fibers of Examples 1 and 5–7, and the drawn fibers of Examaple 2 and 3, and fiber samples 2, 3 and 4 of Example 4, all are illustrations of fibers of this invention and each has an intial modulus of at least about 70 gpd. and a sonic velocity of at least 3.0 km./sec.

The preceding representative examples may be varied within the scope of the present total specification disclosure, and understood and practiced by one skilled in the art, to achieve essentially the same results.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A synthetic fiber of a polyurea wherein at least about 97 mole percent of its recurring units have the structural formula

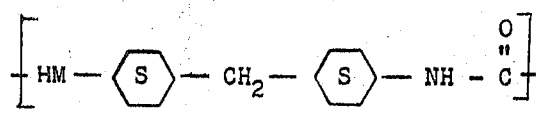

and from 0 to 3 mole percent of its recurring units have the structural formula

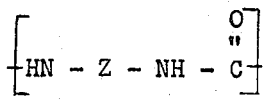

wherein

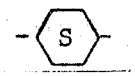

represents a 1,4-cyclohexylene group and Z represents a divalent organic group selected from alkylene of three to six carbon atoms,

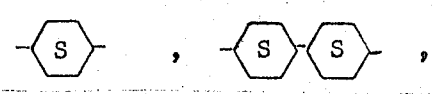

and

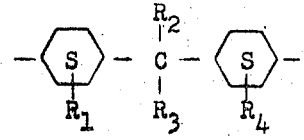

where $R_1$, $R_2$, $R_3$ and $R_4$ each represent hydrogen or methyl groups with the proviso that at least one of $R_1$–$R_4$ is methyl; and wherein at least about 69 percent of the

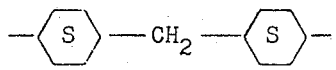

groups, at least about 69 percent of the

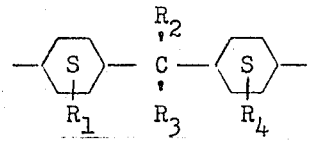

groups, and at least about 69 percent of the

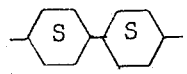

groups, have both their cyclohexylene moieties in the trans configuration and at least about 69 percent of the

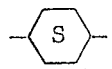

groups in the formula

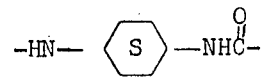

are in the trans configuration; said fiber having an inital modulus of at least about 70 gpd. and a sonic velocity of at least 3.0 km./sec.

2. The fiber of claim 1 wherein the polyurea consists essentially of recurring units of the structural formula:

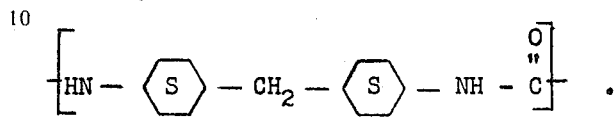

3. The fiber of claim 2 wherein at least 90 pecent of the

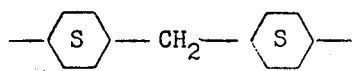

groups present have both their

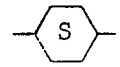

groups in the trans configuration.

* * * * *

PO-1050
(5/69)

UNITED STATES PATENT OFFICE
CERTIFICATE OF CORRECTION

Patent No. 3,857,819      Dated December 31, 1974

Inventor(s) Ronald Dean Mathis

It is certified that error appears in the above-identified patent and that said Letters Patent are hereby corrected as shown below:

Col. 18, line 39, after "to" insert -- about --.

Signed and sealed this 4th day of March 1975.

(SEAL)
Attest:

RUTH C. MASON
Attesting Officer

C. MARSHALL DANN
Commissioner of Patents
and Trademarks